United States Patent [19]

Muehlhauser

[11] Patent Number: 4,603,715
[45] Date of Patent: Aug. 5, 1986

[54] ATTACHMENT FOR POWER TOOL

[76] Inventor: Bruce Muehlhauser, Rte. 1, Sandstone, Minn. 55072

[21] Appl. No.: 672,662

[22] Filed: Nov. 19, 1984

[51] Int. Cl.⁴ ............................................. B27C 9/02
[52] U.S. Cl. ................................... 144/1 E; 144/1 F; 30/122
[58] Field of Search ................ 30/122; 144/1 E, 1 F, 144/134 D, 114 R, 117 R, 208 E

[56] References Cited

U.S. PATENT DOCUMENTS

| 1,636,863 | 7/1927 | Jehle | 144/1 E |
| 2,771,104 | 11/1956 | Saxe | 144/134 D |
| 3,747,650 | 7/1973 | Heisler | 144/1 E |
| 4,279,280 | 7/1981 | Pairis | 144/1 F |

FOREIGN PATENT DOCUMENTS

| 853487 | 10/1970 | Canada | 144/208 C |
| 1215344 | 4/1966 | Fed. Rep. of Germany | 144/208 C |
| 734911 | 8/1932 | France | 144/117 C |

Primary Examiner—W. D. Bray
Attorney, Agent, or Firm—Allan O. Maki

[57] ABSTRACT

A device is provided operable by rotary power means such as a common gas powered chain saw with bar and chain removed therefrom or a rotary electric saw with blade removed, which enables easy matching of logs for construction of log houses or other log buildings, the device having means to engage the drive mechanism of the rotary power means, the drive sprocket of a chain saw, the device including an elongated rotatable cutter preferably with multiple blades and having an elongated guide which shrouds all but one side of the cutting blade and which guide provides a means for sliding the cutter along the pre-cut side of one log and enabling the cutting to match that of another log which is placed and spaced in a juxtaposition with the cut side of said log; the movements of the guide along any imperfections in the cut log will result in a matching mirror image cut of the juxtaposed log.

2 Claims, 6 Drawing Figures

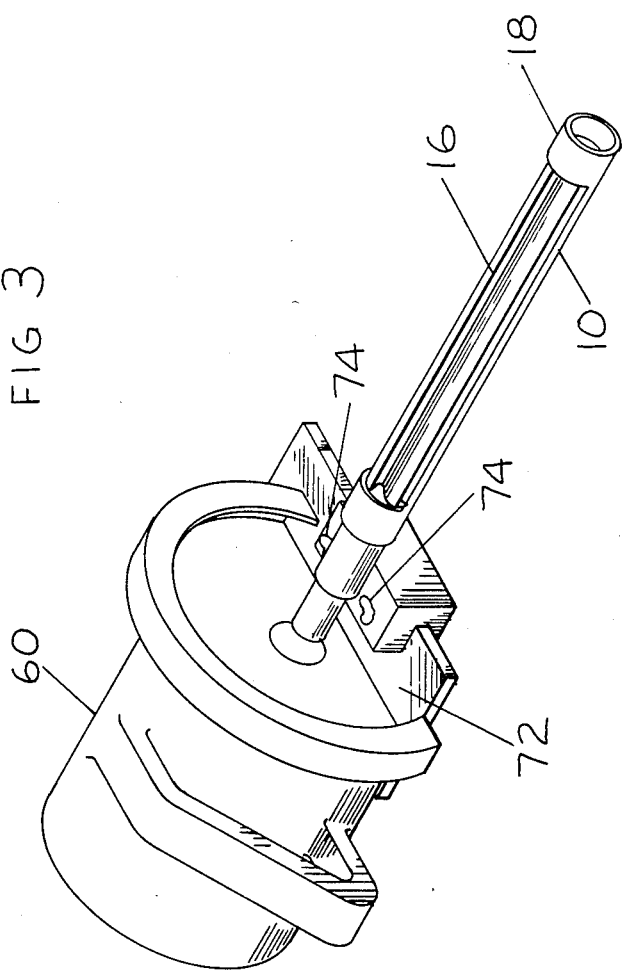
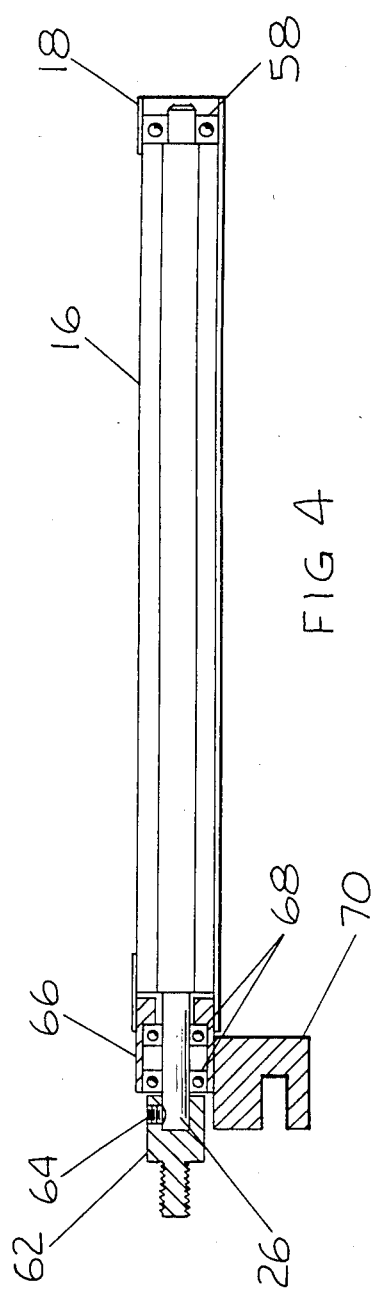

4,603,715

ATTACHMENT FOR POWER TOOL

SUMMARY OF THE INVENTION

This invention relates to a novel tool for cutting away a side of one log so that it will match the cut side of a previously cut log thereby facilitating construction of log type homes and buildings.

It has heretofore been a time consuming and tedious process to build log type buildings because conventional cutting methods involve a great deal of hand labor and skill on the part of the craftsman, thus making such structures slow and costly to build. The present invention provides a device which enables rapid accurate cutting of the mirror image of a cut surface into the surface of another log thereby greatly speeding up the building of a log structure.

It is an object of the present invention to provide a cutting tool which can be attached to a conventional chain saw or rotary electric saw and which thus is portable and inexpensive. It will thus be appreciated that the device can, if desired, be used at locations removed from electric power supplies. An important advantage of the present invention is to produce a device which can be used by a person with limited skill, but which enables accurate and rapid cutting of logs to match so that they may be closely fitted together in a log structure.

Another important advantage of the present invention is the providing of a cutting device which with small modification can be adapted to fit various makes and models of commercially available rotary electric saws and gas powered chain saws having various drive sprocket or hub configurations.

Further objects and advantages of the invention will be apparent from the following detailed description and accompanying drawings wherein:

FIG. 3 is a cross-sectional view of the device of this invention, and

FIG. 4 is a cross-sectional view of an optional attachment which may be used in connection with the invention.

Figure 1:
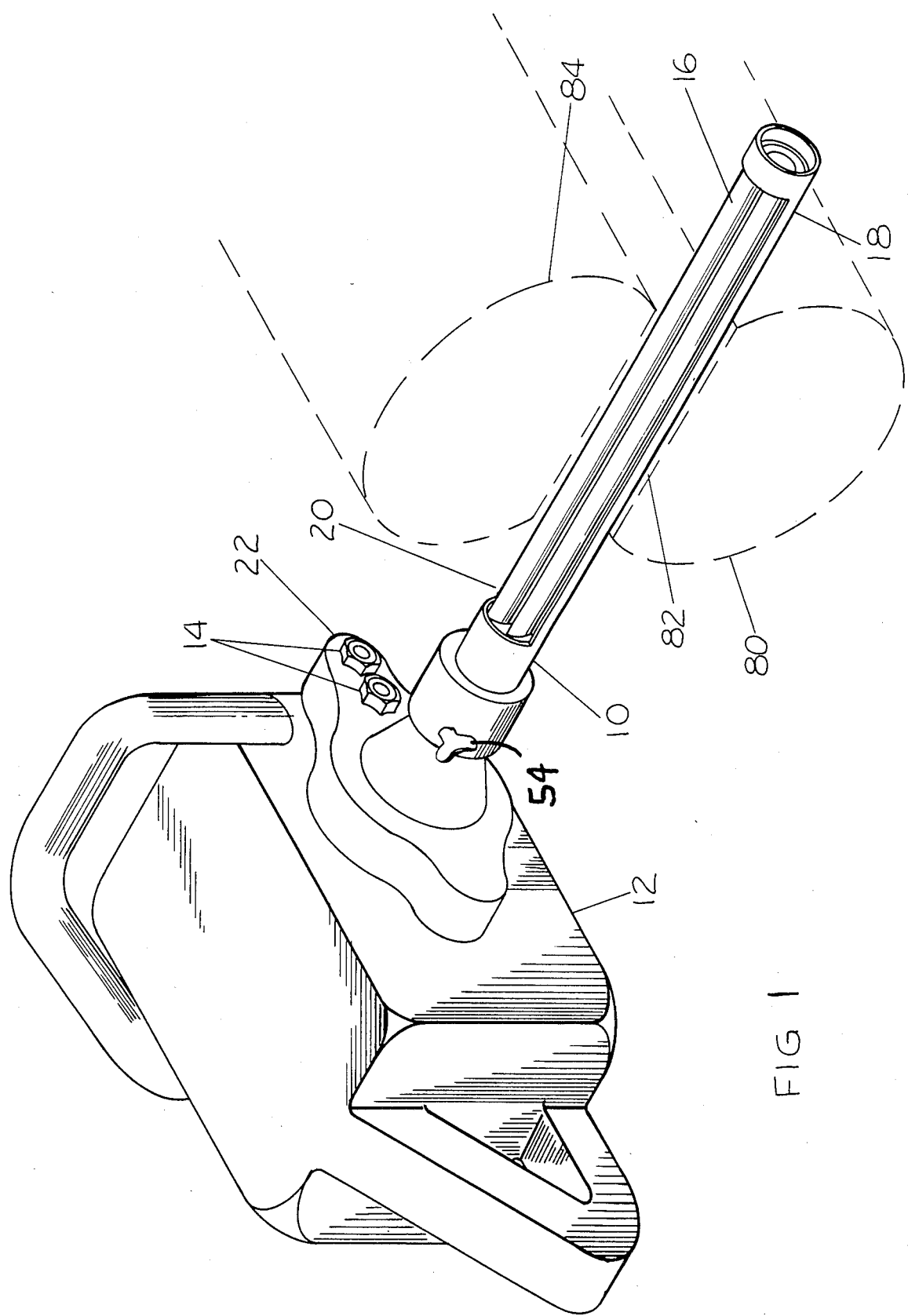
FIG. 1 is a perspective view of device of this invention attached to a chain saw with logs shown by dotted lines.

Referring more particularly to the drawings, there is seen in FIG. 1 a cutter 10 attached to the body of chain saw 12 by means of stud bolts and nuts 14 of a type conventionally provided as a means for attaching a cutting bar and chain to the chain saw body. The device of this invention is attached to the chain saw by removing the cutting bar and chain and bolting the attachment on in place thereof. Cutting element 10 is provided with a series of rotatable blades 16 located around the circumference thereof. The preferred configuration for the cutter is the use of a fluted cutter configuration provided with three or more blades. A shield 18 which is stationary and non-rotatable by virtue of being fixed to the chain saw body through suitable coupling brackets encircles the cutting blades 16. Shield or shroud 18 has a cut-away portion 20 which exposes rotatable cutting elements 16. Mounting bracket 22 is in the shape of a housing which encloses the clutch engaging mechanism utilized to transmit rotary movement of the saw engine to the cutter, and is of a size and shape adapted to fit around the rotatable clutch mechanism of the chain saw and to engage the mounting studs 14. Mounting bracket 22 is provided with holes 24 adapted to slide over the studs 14.

Figure 2:
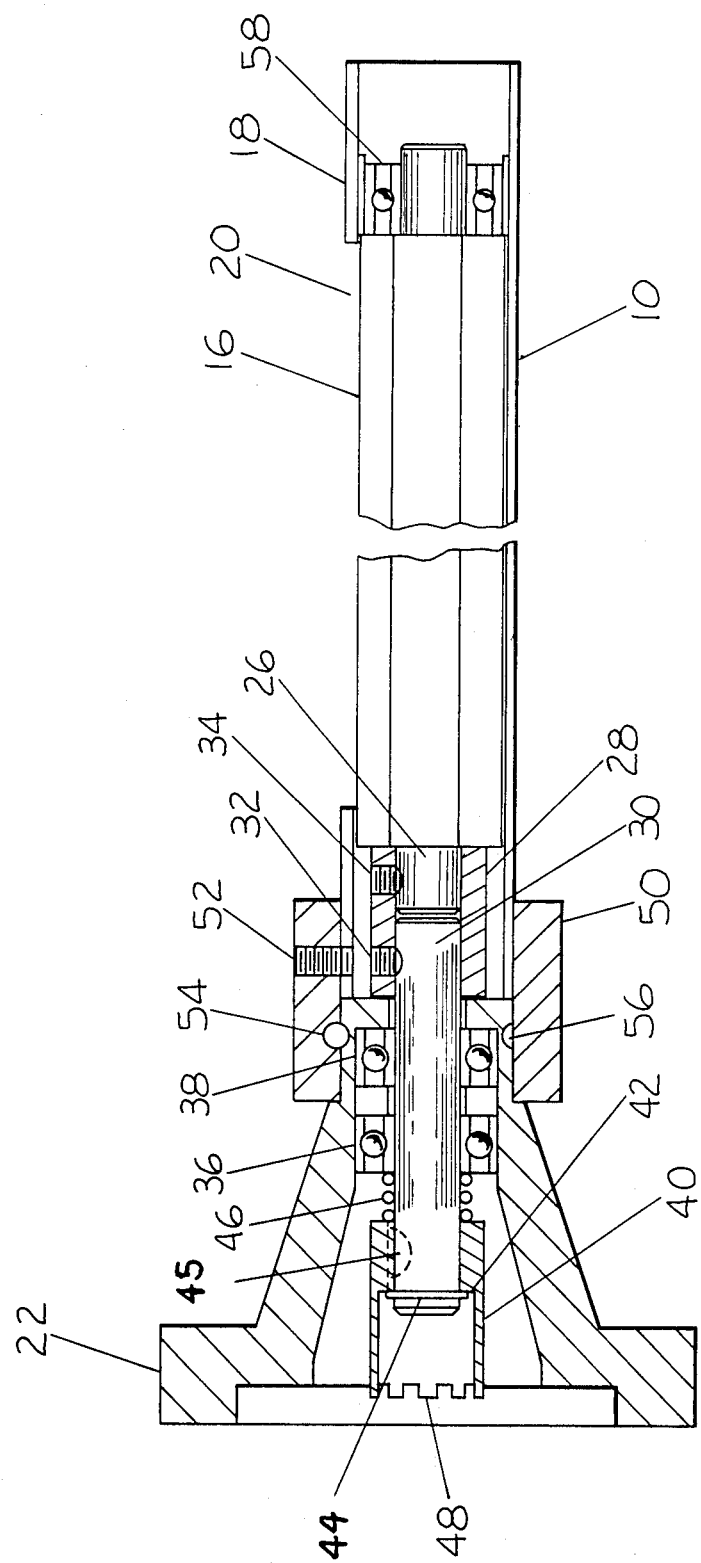
FIG. 2 is a perspective view showing assembly of the device with an adapter to fit one type of drive plate configuration.
Figure 5:
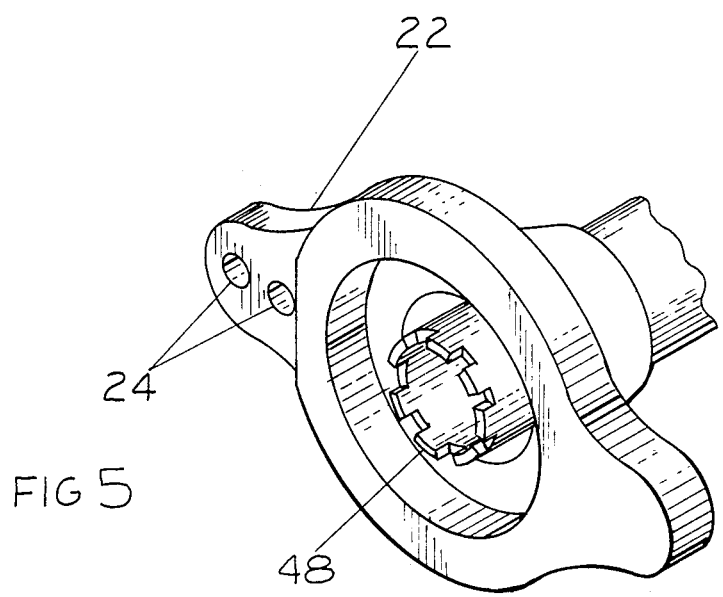
FIG. 5 is a perspective view of the mounting bracket of the invention.

The preferred construction of the attachment 10 is shown in detail in FIG. 2. As shown, cutter 16 is provided with a driven end 26 attached by a sleeve type coupler 28 to a cylindrical shaft 30. Coupler 28 may be securely attached to shaft 30 and end 26, for example, by means of set screws, 32 and 34. Shaft 30 is rotable positioned within housing 22 by means of bearings 36 and 38. Slideably affixed to shaft 30 is a drive engaging means 40 which is provided with internal shoulder 42. A retaining means such as a keeper ring 44 is affixed to the end of shaft 30 to retain drive engaging means 40 on said shaft. An interior longitudal groove is provided in drive engaging means 40 to receive a key 45 which is shown to be a half moon key for purposes of illustration. Means 40 can thus slide on shaft 30 but due to the key and groove, the two are compelled to rotate together. Spring 46 is provided to exert yieldable outward pressure on drive engaging means 40. The outer end of means 40 is provided with teeth 48 designed to engage indentations conventionally provided on a chain saw drive sprocket. When the attachment is affixed to a chain saw the teeth 48 will thus be urged by spring 46 into contact with such indentations on the drive sprocket, thereby providing a means for transferring rotational motion of said sprocket to cause rotation of cutting blades 16.

Also shown in FIG. 2 is an example of means for holding shroud 18 in stationary relationship with respect to chain saw 14. In the illustrated embodiment a sleeve is press fit around the end of shroud 18. Other means such as set screw 52 may be employed to positively affix sleeve 50 to shroud 18. Means such as a tapered pin 54 is also provided to affix sleeve 50 to housing 22. A hole is provided in one side of sleeve 50 to receive pin 54 and a groove 56 is provided on the surface of housing 22 to engage the pin, thereby holding shroud 18 in place around cutter 16. A bearing 58 is also provided within shroud 18 to hold the free end of cutter shaft 26 for rotation inside of shroud 18.

In its broadest aspects this invention provides a means for converting a gas powered chain saw and into a device for driving various rotary power tools thereby making such tools portable and available at job sites far removed from any source of electric power. Examples of such tools are drill bits, routers, circular saws and band saws. In such embodiments, not specifically illustrated in the drawings, a drive engaging sleeve 40 would be provided over a shaft 30 rotationally held within housing 22, but other rotating means would be substituted in place of cutter 16. Various ways to affix such tools to rotating shaft 30 will be apparent to those skilled in the art. Thus, for example, by the use of a band saw a device can be provided which will saw logs into boards utilizing a band saw which is readily portable and needs no other drive mechanism other than a standard chain saw.

A further embodiment of the invention is shown in FIG. 3 and FIG. 4. In that embodiment cutting means 10 including cutter 16 and shroud 18 as affixed to a rotating electric motor 60 of a type conventionally used for rotary power saws. Thus the blade of a rotary power saw can be removed and cutter 10 affixed thereto instead. As specifically seen in FIG. 4, the shaft 26 which forms the driven end of cutter 16 is affixed to a coupler 62 by mechanical device such as set screw 64. The end of shaft 26 is held for rotation within a housing 66 by means of bearings 68. Housing 66 is provided with a bracket 70 integral therewith which is adapted to be clamped onto work engaging plate 72 which is a conventional part of rotary power saw 60. Means such as thumb screws 74 may be utilized to positively clamp bracket 70 onto plate 72 thereby holding housing 66 in fixed relationship with respect to saw 60. As noted cutter 16 is free to rotate within the bearings 68 and 58.

The embodiment shown in FIG. 3 and FIG. 4 thus provides a means for driving shrouded cutter 16 by means of a rotary saw 60. The embodiment shown on FIG. 3 or FIG. 4 may be utilized where a source of electric power is available at a job site and there is a desire to utilize an electric drive means rather than a gas powered means.

The operation of the invention can best be seen in FIG. 1. As viewed in FIG. 1 the lowermost log 80 has previously had the top surface 82 thereof cut away to form a more or less flat surface. A second log 84 is suspended above the first log using any appropriate means to hold the log in justaposed spaced relationship above log 80. Cutter 16 is then used to cut away the lower surface of log 84 with shroud 18 riding on the cut surface 82 of log 80. Since the cut surface 82 will have some irregularities due to limitations of cutting methods it has been found that as shroud 18 rides along surface 82 over the irregularities that the bottom surface of log 84 will be cut in a mirror image to match irregularities of the surface 82. Cutting can thus be accomplished rapidly, as it will be apparent that a relatively unskilled craftsman is able to operate the device.

Figure 6:
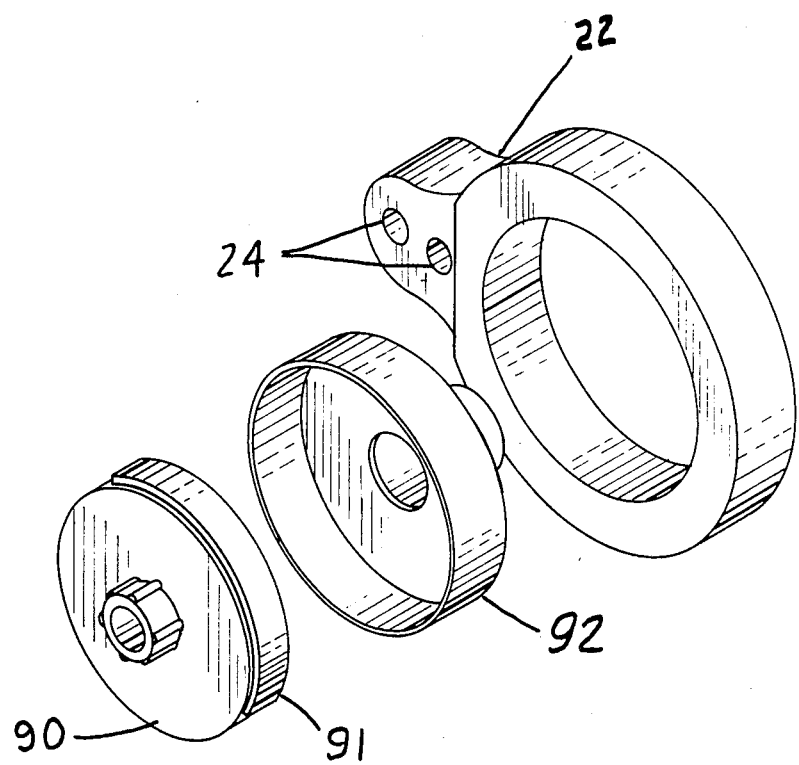
FIG. 6 is a perspective view of an optional means for attaching a cutter to a chain saw.

FIG. 6 illustrates an optional means for attaching a cutter to a chain saw where the saw is of a type in which the clutch has no indentations. In such case a friction fit system may be used. Clutch plate 90 may be provided with a fibrous pad 91, formed, for example, from brake lining stock or equivalent material. A hub 92 is attached to the end of the cutter shaft and is of such size as to fit tightly over fibrous material 91. The tight fit of these parts serves to couple plate 90 and hub 92 in such fashion that the rotational motion of the clutch is transmitted to the rotary cutter.

The foregoing description illustrates the preferred embodiment of the invention, but those skilled in the art will note that various changes may be made in the construction thereof within the scope of the appended claims and without departing from the spirit of the invention.

What is claimed is:

1. A method of cutting surface of a log into a mirror image of the pre-cut surface of another log comprising,
   (a) supporting said log with the pre-cut surface in a horizontal position with the pre-cut surface facing upward,
   (b) placing the log to be cut in a position spaced a small distance above and parallel to said pre-cut log,
   (c) providing a power driven rotating cutting element including an elongated rotatable cutting element comprising a plurality of elongated cutting elements spaced around the circumference thereof, said cutting element being provided with a coupling device adapted to engage a rotatable power drive means, shield means encircling the circumference of said cutting element, an opening being provided along one side of said shield means to expose one side of said cutting element, said shield means being attached to the stationary body of said drive means and thereby rendered non-rotatable, and having a smooth outer working surface adapted to slide along said pre-cut log, and
   (d) sliding the shield along said pre-cut surface from one end to the other, thus causing said rotating cutting element to cut the lower surface of said upper log into a mirror image of said pre-cut log.

2. Method according to claim 1 wherein said power means comprises a gasoline powered chain saw with cutting bar removed.

* * * * *